US008713021B2

(12) United States Patent
Bellegarda

(10) Patent No.: US 8,713,021 B2
(45) Date of Patent: Apr. 29, 2014

(54) UNSUPERVISED DOCUMENT CLUSTERING USING LATENT SEMANTIC DENSITY ANALYSIS

(75) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 451 days.

(21) Appl. No.: 12/831,909

(22) Filed: Jul. 7, 2010

(65) Prior Publication Data
US 2012/0011124 A1    Jan. 12, 2012

(51) Int. Cl.
*G06F 17/30* (2006.01)

(52) U.S. Cl.
USPC ............................................ 707/739; 704/10

(58) Field of Classification Search
USPC .............. 707/739, 100, 3, 706, 723, 737, 1/1, 707/999, 769, 500
See application file for complete search history.

(56) References Cited

U.S. PATENT DOCUMENTS

| 3,704,345 | A | 11/1972 | Coker et al. |
| 3,828,132 | A | 8/1974 | Flanagan et al. |
| 3,979,557 | A | 9/1976 | Schulman et al. |
| 4,278,838 | A | 7/1981 | Antonov |
| 4,282,405 | A | 8/1981 | Taguchi |
| 4,310,721 | A | 1/1982 | Manley et al. |
| 4,348,553 | A | 9/1982 | Baker et al. |
| 4,653,021 | A | 3/1987 | Takagi |
| 4,688,195 | A | 8/1987 | Thompson et al. |
| 4,692,941 | A | 9/1987 | Jacks et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| 4,776,016 | A | 10/1988 | Hansen |
| 4,783,807 | A | 11/1988 | Marley |
| 4,811,243 | A | 3/1989 | Racine |
| 4,819,271 | A | 4/1989 | Bahl et al. |
| 4,827,520 | A | 5/1989 | Zeinstra |

(Continued)

FOREIGN PATENT DOCUMENTS

| CH | 681573 A5 | 4/1993 |
| DE | 3837590 A1 | 5/1990 |

(Continued)

OTHER PUBLICATIONS

Alfred App, 2011, http://www.alfredapp.com/, 5 pages.

(Continued)

*Primary Examiner* — James Trujillo
*Assistant Examiner* — Thong Vu
(74) *Attorney, Agent, or Firm* — Morrison & Foerster LLP

(57) ABSTRACT

According to one embodiment, a latent semantic mapping (LSM) space is generated from a collection of a plurality of documents, where the LSM space includes a plurality of document vectors, each representing one of the documents in the collection. For each of the document vectors considered as a centroid document vector, a group of document vectors is identified in the LSM space that are within a predetermined hypersphere diameter from the centroid document vector. As a result, multiple groups of document vectors are formed. The predetermined hypersphere diameter represents a predetermined closeness measure among the document vectors in the LSM space. Thereafter, a group from the plurality of groups is designated as a cluster of document vectors, where the designated group contains a maximum number of document vectors among the plurality of groups.

24 Claims, 8 Drawing Sheets

(56) References Cited

U.S. PATENT DOCUMENTS

| | | |
|---|---|---|
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A * | 10/1997 | Schuetze .................. 704/10 |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,864,855 A * | 1/1999 | Ruocco et al. .................. 1/1 |
| 5,867,799 A | 2/1999 | Lang et al. |
| 5,873,056 A | 2/1999 | Liddy et al. |

(56) References Cited

U.S. PATENT DOCUMENTS

| | | | |
|---|---|---|---|
| 5,875,437 A | 2/1999 | Atkins | |
| 5,884,323 A | 3/1999 | Hawkins et al. | |
| 5,895,464 A | 4/1999 | Bhandari et al. | |
| 5,895,466 A | 4/1999 | Goldberg et al. | |
| 5,899,972 A | 5/1999 | Miyazawa et al. | |
| 5,913,193 A | 6/1999 | Huang et al. | |
| 5,915,249 A | 6/1999 | Spencer | |
| 5,930,769 A | 7/1999 | Rose | |
| 5,933,822 A | 8/1999 | Braden-Harder et al. | |
| 5,936,926 A | 8/1999 | Yokouchi et al. | |
| 5,940,811 A | 8/1999 | Norris | |
| 5,941,944 A | 8/1999 | Messerly | |
| 5,943,670 A | 8/1999 | Prager | |
| 5,948,040 A | 9/1999 | DeLorme et al. | |
| 5,956,699 A | 9/1999 | Wong et al. | |
| 5,960,422 A | 9/1999 | Prasad | |
| 5,963,924 A | 10/1999 | Williams et al. | |
| 5,966,126 A | 10/1999 | Szabo | |
| 5,970,474 A | 10/1999 | LeRoy et al. | |
| 5,974,146 A | 10/1999 | Randle et al. | |
| 5,982,891 A | 11/1999 | Ginter et al. | |
| 5,987,132 A | 11/1999 | Rowney | |
| 5,987,140 A | 11/1999 | Rowney et al. | |
| 5,987,404 A | 11/1999 | Della Pietra et al. | |
| 5,987,440 A | 11/1999 | O'Neil et al. | |
| 5,999,908 A | 12/1999 | Abelow | |
| 5,999,927 A | 12/1999 | Tukey et al. | |
| 6,016,471 A | 1/2000 | Kuhn et al. | |
| 6,023,684 A | 2/2000 | Pearson | |
| 6,024,288 A | 2/2000 | Gottlich et al. | |
| 6,026,345 A | 2/2000 | Shah et al. | |
| 6,026,375 A | 2/2000 | Hall et al. | |
| 6,026,388 A | 2/2000 | Liddy et al. | |
| 6,026,393 A | 2/2000 | Gupta et al. | |
| 6,029,132 A | 2/2000 | Kuhn et al. | |
| 6,038,533 A | 3/2000 | Buchsbaum et al. | |
| 6,052,656 A | 4/2000 | Suda et al. | |
| 6,055,514 A | 4/2000 | Wren | |
| 6,055,531 A | 4/2000 | Bennett et al. | |
| 6,064,960 A | 5/2000 | Bellegarda et al. | |
| 6,070,139 A | 5/2000 | Miyazawa et al. | |
| 6,070,147 A | 5/2000 | Harms et al. | |
| 6,076,051 A | 6/2000 | Messerly et al. | |
| 6,076,088 A | 6/2000 | Paik et al. | |
| 6,078,914 A | 6/2000 | Redfern | |
| 6,081,750 A | 6/2000 | Hoffberg et al. | |
| 6,081,774 A | 6/2000 | de Hita et al. | |
| 6,088,731 A | 7/2000 | Kiraly et al. | |
| 6,094,649 A | 7/2000 | Bowen et al. | |
| 6,105,865 A | 8/2000 | Hardesty | |
| 6,108,627 A | 8/2000 | Sabourin | |
| 6,119,101 A | 9/2000 | Peckover | |
| 6,122,616 A | 9/2000 | Henton | |
| 6,125,356 A | 9/2000 | Brockman et al. | |
| 6,144,938 A | 11/2000 | Surace et al. | |
| 6,173,261 B1 | 1/2001 | Arai et al. | |
| 6,173,279 B1 | 1/2001 | Levin et al. | |
| 6,188,999 B1 | 2/2001 | Moody | |
| 6,195,641 B1 | 2/2001 | Loring et al. | |
| 6,205,456 B1 | 3/2001 | Nakao | |
| 6,208,971 B1 | 3/2001 | Bellegarda et al. | |
| 6,233,559 B1 | 5/2001 | Balakrishnan | |
| 6,233,578 B1 | 5/2001 | Machihara et al. | |
| 6,246,981 B1 | 6/2001 | Papineni et al. | |
| 6,260,024 B1 | 7/2001 | Shkedy | |
| 6,266,637 B1 | 7/2001 | Donovan et al. | |
| 6,275,824 B1 | 8/2001 | O'Flaherty et al. | |
| 6,285,786 B1 | 9/2001 | Seni et al. | |
| 6,308,149 B1 | 10/2001 | Gaussier et al. | |
| 6,311,189 B1 | 10/2001 | deVries et al. | |
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,356,905 B1 | 3/2002 | Gershman et al. | |
| 6,366,883 B1 | 4/2002 | Campbell et al. | |
| 6,366,884 B1 | 4/2002 | Bellegarda et al. | |
| 6,374,217 B1 | 4/2002 | Bellegarda | |
| 6,421,672 B1 | 7/2002 | McAllister et al. | |
| 6,434,524 B1 | 8/2002 | Weber | |
| 6,446,076 B1 | 9/2002 | Burkey et al. | |
| 6,449,620 B1 | 9/2002 | Draper et al. | |
| 6,453,292 B2 | 9/2002 | Ramaswamy et al. | |
| 6,460,029 B1 | 10/2002 | Fries et al. | |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,505,175 B1 | 1/2003 | Silverman et al. | |
| 6,505,183 B1 | 1/2003 | Loofbourrow et al. | |
| 6,510,417 B1 | 1/2003 | Woods et al. | |
| 6,513,063 B1 | 1/2003 | Julia et al. | |
| 6,523,061 B1 | 2/2003 | Halverson et al. | |
| 6,523,172 B1 | 2/2003 | Martinez-Guerra et al. | |
| 6,526,382 B1 | 2/2003 | Yuschik | |
| 6,526,395 B1 | 2/2003 | Morris | |
| 6,532,444 B1 | 3/2003 | Weber | |
| 6,532,446 B1 | 3/2003 | King | |
| 6,546,388 B1 | 4/2003 | Edlund et al. | |
| 6,553,344 B2 | 4/2003 | Bellegarda et al. | |
| 6,556,983 B1 | 4/2003 | Altschuler et al. | |
| 6,584,464 B1 | 6/2003 | Warthen | |
| 6,598,039 B1 | 7/2003 | Livowsky | |
| 6,598,054 B2 * | 7/2003 | Schuetze et al. | 1/1 |
| 6,601,026 B2 | 7/2003 | Appelt et al. | |
| 6,601,234 B1 | 7/2003 | Bowman-Amuah | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,615,220 B1 | 9/2003 | Austin et al. | |
| 6,625,583 B1 | 9/2003 | Silverman et al. | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,671,683 B2 * | 12/2003 | Kanno | 1/1 |
| 6,684,187 B1 | 1/2004 | Conkie | |
| 6,691,064 B2 | 2/2004 | Vroman | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,697,824 B1 | 2/2004 | Bowman-Amuah | |
| 6,701,294 B1 | 3/2004 | Ball et al. | |
| 6,701,318 B2 * | 3/2004 | Fox et al. | 707/706 |
| 6,711,585 B1 | 3/2004 | Copperman et al. | |
| 6,718,324 B2 | 4/2004 | Edlund et al. | |
| 6,721,728 B2 | 4/2004 | McGreevy | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,766,320 B1 | 7/2004 | Wang et al. | |
| 6,778,951 B1 | 8/2004 | Contractor | |
| 6,778,952 B2 | 8/2004 | Bellegarda | |
| 6,778,962 B1 | 8/2004 | Kasai et al. | |
| 6,778,970 B2 | 8/2004 | Au | |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,829,603 B1 | 12/2004 | Wolf et al. | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,847,979 B2 | 1/2005 | Allemang et al. | |
| 6,851,115 B1 | 2/2005 | Cheyer et al. | |

(56) References Cited

U.S. PATENT DOCUMENTS

| | | | |
|---|---|---|---|
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,996,575 B2 | 2/2006 | Cox et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,031,909 B2* | 4/2006 | Mao et al. | 704/9 |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,076,527 B2 | 7/2006 | Bellegarda et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,124,081 B1 | 10/2006 | Bellegarda | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,149,695 B1 | 12/2006 | Bellegarda | |
| 7,152,070 B1 | 12/2006 | Musick et al. | |
| 7,177,798 B2 | 2/2007 | Hsu et al. | |
| 7,194,471 B1* | 3/2007 | Nagatsuka et al. | 1/1 |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,373,612 B2* | 5/2008 | Risch et al. | 715/850 |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,389,225 B1* | 6/2008 | Jensen et al. | 704/9 |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,428,541 B2* | 9/2008 | Houle | 1/1 |
| 7,433,869 B2* | 10/2008 | Gollapudi | 1/1 |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,499,923 B2* | 3/2009 | Kawatani | 1/1 |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,555,496 B1* | 6/2009 | Lantrip et al. | 1/1 |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,672,952 B2* | 3/2010 | Isaacson et al. | 707/999.01 |
| 7,676,026 B1 | 3/2010 | Baxter, Jr. | |
| 7,676,463 B2 | 3/2010 | Thompson et al. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,797,265 B2* | 9/2010 | Brinker et al. | 706/45 |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,870,118 B2* | 1/2011 | Jiang et al. | 707/706 |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |

(56) References Cited

U.S. PATENT DOCUMENTS

| | | | |
|---|---|---|---|
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,949,534 B2 | 5/2011 | Davis et al. | |
| 7,953,679 B2* | 5/2011 | Chidlovskii et al. | 706/18 |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |
| 7,987,151 B2 | 7/2011 | Schott et al. | |
| 7,996,228 B2 | 8/2011 | Miller et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,046,363 B2* | 10/2011 | Cha et al. | 707/739 |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,099,418 B2* | 1/2012 | Inoue et al. | 707/748 |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,131,557 B2 | 3/2012 | Davis et al. | |
| 8,140,335 B2 | 3/2012 | Kennewick et al. | |
| 8,140,567 B2* | 3/2012 | Padovitz et al. | 707/769 |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,374,871 B2 | 2/2013 | Ehsani et al. | |
| 8,447,612 B2 | 5/2013 | Gazdzinski | |
| 2001/0047264 A1 | 11/2001 | Roundtree | |
| 2002/0032564 A1 | 3/2002 | Ehsani et al. | |
| 2002/0046025 A1 | 4/2002 | Hain | |
| 2002/0069063 A1 | 6/2002 | Buchner et al. | |
| 2002/0077817 A1 | 6/2002 | Atal | |
| 2002/0103641 A1 | 8/2002 | Kuo et al. | |
| 2002/0164000 A1 | 11/2002 | Cohen et al. | |
| 2002/0198714 A1 | 12/2002 | Zhou | |
| 2003/0037073 A1* | 2/2003 | Tokuda et al. | 707/500 |
| 2004/0135701 A1 | 7/2004 | Yasuda et al. | |
| 2004/0236778 A1 | 11/2004 | Junqua et al. | |
| 2005/0055403 A1 | 3/2005 | Brittan | |
| 2005/0071332 A1 | 3/2005 | Ortega et al. | |
| 2005/0080625 A1 | 4/2005 | Bennett et al. | |
| 2005/0091118 A1 | 4/2005 | Fano | |
| 2005/0102614 A1 | 5/2005 | Brockett et al. | |
| 2005/0108001 A1 | 5/2005 | Aarskog | |
| 2005/0114124 A1 | 5/2005 | Liu et al. | |
| 2005/0119897 A1 | 6/2005 | Bennett et al. | |
| 2005/0143972 A1 | 6/2005 | Gopalakrishnan et al. | |
| 2005/0165607 A1 | 7/2005 | DiFabbrizio et al. | |
| 2005/0182629 A1 | 8/2005 | Coorman et al. | |
| 2005/0196733 A1 | 9/2005 | Budra et al. | |
| 2005/0246350 A1* | 11/2005 | Canaran | 707/100 |
| 2005/0288936 A1 | 12/2005 | Busayapongchai et al. | |
| 2006/0018492 A1 | 1/2006 | Chiu et al. | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0143007 A1 | 6/2006 | Koh et al. | |
| 2006/0212415 A1 | 9/2006 | Backer et al. | |
| 2006/0282415 A1* | 12/2006 | Shibata et al. | 707/3 |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0135949 A1 | 6/2007 | Snover et al. | |
| 2007/0174188 A1 | 7/2007 | Fish | |
| 2007/0185917 A1 | 8/2007 | Prahlad et al. | |
| 2007/0282595 A1 | 12/2007 | Tunning et al. | |
| 2008/0015864 A1 | 1/2008 | Ross et al. | |
| 2008/0021708 A1 | 1/2008 | Bennett et al. | |
| 2008/0034032 A1 | 2/2008 | Healey et al. | |
| 2008/0052063 A1 | 2/2008 | Bennett et al. | |
| 2008/0097937 A1* | 4/2008 | Hadjarian | 706/12 |
| 2008/0120112 A1 | 5/2008 | Jordan et al. | |
| 2008/0129520 A1 | 6/2008 | Lee | |
| 2008/0140657 A1 | 6/2008 | Azvine et al. | |
| 2008/0221903 A1 | 9/2008 | Kanevsky et al. | |
| 2008/0228496 A1 | 9/2008 | Yu et al. | |
| 2008/0228928 A1* | 9/2008 | Donelli et al. | 709/228 |
| 2008/0247519 A1 | 10/2008 | Abella et al. | |
| 2008/0249770 A1 | 10/2008 | Kim et al. | |
| 2008/0294651 A1* | 11/2008 | Masuyama et al. | 707/100 |
| 2008/0300878 A1 | 12/2008 | Bennett | |
| 2008/0319763 A1 | 12/2008 | Di Fabbrizio et al. | |
| 2009/0006100 A1 | 1/2009 | Badger et al. | |
| 2009/0006343 A1 | 1/2009 | Platt et al. | |
| 2009/0030800 A1 | 1/2009 | Grois | |
| 2009/0049067 A1* | 2/2009 | Murray | 707/100 |
| 2009/0055179 A1 | 2/2009 | Cho et al. | |
| 2009/0058823 A1 | 3/2009 | Kocienda | |
| 2009/0076796 A1 | 3/2009 | Daraselia | |
| 2009/0077165 A1 | 3/2009 | Rhodes et al. | |
| 2009/0100049 A1 | 4/2009 | Cao | |
| 2009/0112677 A1 | 4/2009 | Rhett | |
| 2009/0150156 A1 | 6/2009 | Kennewick et al. | |
| 2009/0157401 A1 | 6/2009 | Bennett | |
| 2009/0164441 A1 | 6/2009 | Cheyer | |
| 2009/0171664 A1 | 7/2009 | Kennewick et al. | |
| 2009/0287583 A1 | 11/2009 | Holmes | |
| 2009/0290718 A1 | 11/2009 | Kahn et al. | |
| 2009/0299745 A1 | 12/2009 | Kennewick et al. | |
| 2009/0299849 A1 | 12/2009 | Cao et al. | |
| 2009/0307162 A1 | 12/2009 | Bui et al. | |
| 2010/0005081 A1 | 1/2010 | Bennett | |
| 2010/0023320 A1 | 1/2010 | Di Cristo et al. | |
| 2010/0036660 A1 | 2/2010 | Bennett | |
| 2010/0042400 A1 | 2/2010 | Block et al. | |
| 2010/0063804 A1* | 3/2010 | Sato et al. | 704/207 |
| 2010/0088020 A1 | 4/2010 | Sano et al. | |
| 2010/0138215 A1 | 6/2010 | Williams | |
| 2010/0145700 A1 | 6/2010 | Kennewick et al. | |
| 2010/0204986 A1 | 8/2010 | Kennewick et al. | |
| 2010/0217604 A1 | 8/2010 | Baldwin et al. | |
| 2010/0228540 A1 | 9/2010 | Bennett | |
| 2010/0235341 A1 | 9/2010 | Bennett | |
| 2010/0250542 A1* | 9/2010 | Fujimaki | 707/737 |
| 2010/0257160 A1 | 10/2010 | Cao | |
| 2010/0262599 A1 | 10/2010 | Nitz | |
| 2010/0274753 A1* | 10/2010 | Liberty et al. | 706/50 |
| 2010/0277579 A1 | 11/2010 | Cho et al. | |

(56) References Cited

U.S. PATENT DOCUMENTS

| | | |
|---|---|---|
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0179002 A1* | 7/2011 | Dumitru et al. ............... 707/706 |
| 2011/0184730 A1 | 7/2011 | LeBeau et al. |
| 2011/0191344 A1* | 8/2011 | Jin et al. ........................ 707/739 |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0238408 A1* | 9/2011 | Larcheveque et al. ............ 704/9 |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 20038517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet EVI: the one mobile app that provides solutions for your everyday problems," Feb. 8, 2012, http://www.evi.com/, 3 pages.

(56) References Cited

OTHER PUBLICATIONS

Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm 30 pages.
Gruber, T. R., "Intelligence at the Interface: Semantic Technology and the Consumer Internet Experience," Presentation at Semantic Technologies conference (SemTech08); May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al.,"Nike: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.

(56) References Cited

OTHER PUBLICATIONS

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (ERA), 18 pages.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, a., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube,"Send Text, Listen to and Send E-Mail 'by Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).
Yu-feng Zhang; Chao He; , "Research of Text Classification Model Based on Latent Semantic Analysis and Improved HS-SVM," Intelligent Systems and Applications (ISA), 2010 2nd International Workshop on , vol., No., pp. 1-5, May 22-23, 2010.
Bellegarda, Jerome R., "Latent Semantic Mapping: A data-driven framework for modeling global relationships implicit in large volumes of data," IEEE Signal Processing Magazine, Sep. 2005.
Heyer, Laurie J., et al., "Exploring Expression Data: Identification and Analysis of Coexpressed Genes," Genome Research, www.genome.org, 9:1106-1115, downloaded from genome.cshlp.org on Jan. 28, 2010.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," in Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.

(56) References Cited

OTHER PUBLICATIONS

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris- France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," COMPUTER Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals,"© 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

(56) References Cited

OTHER PUBLICATIONS

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties, dspGuro, Digital Signal Processing Central," http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 COMPUTER, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L., et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

(56) References Cited

OTHER PUBLICATIONS

Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-44489115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," in Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.

(56) References Cited

OTHER PUBLICATIONS

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Roddy, D., et al., "Communication and Collaboration in a Landscape of B2B eMarketplaces," VerticalNet Solutions, white paper, Jun. 15, 2000, 23 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "Clare: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z__1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright ® 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.

(56) References Cited

OTHER PUBLICATIONS

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of US Patent No. 7,177,798, Mar. 22, 2013, 1 page.

Exhibit 1, "Natural Language Interface Using Constrained Intermediate Dictionary of Results," List of Publications Manually reviewed for the Search of US Patent No. 7,177,798, Mar. 22, 2012, 1 page.

Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al., "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research Institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

Grosz, B., et al., "TEAM: An Experiment in the Design of Transportable Natural-Language Interfaces," Artificial Intelligence, vol. 32, 1987, 71 pages.

Grosz, B., "Team: A Transportable Natural-Language Interface System," 1983, Proceedings of the First Conference on Applied Natural Language Processing, 7 pages.

Guida, G., et al., "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, Vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages.

Hendrix, G., "The Lifer Manual: A Guide to Building Practical Natural Language Interfaces," Feb. 1977, SRI International, 76 pages.

Hendrix, G., et al., "Transportable Natural-Language Interfaces to Databases," Apr. 30, 1981, SRI International, 18 pages.

Hirschman, L., et al., "Multi-Site Data Collection and Evaluation in Spoken language Understanding," 1993, Proceedings of the workshop on Human Language Technology, 6 pages.

Hobbs, J., et al., "Fastus: A System for Extracting Infromation from Nautural-Language Text," Nov. 19, 1992, SRI International, Artificial Intelligence Center, 26 pages.

Hobbs, J., et al., "Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., "The SPHINX-II Speech Recognition System: An Overview," Jan. 15, 1992, Computer, Speech and Language, 14 pages.

Issar, S., et al., "CMU's Robust Spoken Language Understanding System," 1993, Proceedings of EUROSPEECH, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Jonhnson, J., "A Data Management Strategy for Transportable Natural Language Interfaces," Jun. 1989, doctoral thesis submitted to the Department of Computer Science, University of British Columbia, Canada, 285 pages.

Julia, L., et al., "Http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP&IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

(56) References Cited

OTHER PUBLICATIONS

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paperps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-lg/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland.

Singh, N., "Unifying Heterogeneous Information Models," 1998 Communications of the ACM, 13 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

(56) References Cited

OTHER PUBLICATIONS

Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the Tacitus Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.

\* cited by examiner

UNSUPERVISED DOCUMENT CLUSTERING USING LATENT SEMANTIC DENSITY ANALYSIS

FIELD OF THE INVENTION

Embodiments of the invention relate generally to the field of document clustering; and more particularly, to document clustering using a latent semantic density analysis.

BACKGROUND

Document clustering refers to the partitioning of a given collection of documents into homogeneous groups which each share one or more identifiable characteristics, such as a common topic. Unsupervised clustering is required in case these characteristics are not explicitly annotated, which corresponds to the majority of practical situations. This type of document grouping is of interest in many applications, from search by content to language modeling for speech recognition.

Cluster analysis is a fundamental tool in pattern recognition and many clustering algorithms are available. They fall roughly into two categories: 1) hierarchical clustering; and 2) K-means clustering and self-organizing maps. Hierarchical clustering methods are popular because of their simplicity. Both top-down and bottom-up (also referred to as agglomerative) variants are available. Top-down approaches start with a single cluster encompassing the entire collection, and recursively split the data into increasingly smaller sub-clusters. In contrast, bottom-up methods start with each observation in a single cluster and iteratively join the closest elements into bigger ones. In both cases, once the underlying tree structure is constructed, the data can be partitioned into any number of clusters by cutting the tree at the appropriate level. Three common options for hierarchical clustering are single linkage, average linkage, and complete linkage. These options differ in their definition of the distance between two clusters.

The K-means method starts with a random assignment of K points that function as cluster centers. Each data point is then assigned to one of these centers in a way that minimizes the sum of distances between all points and their centers. Improved positions for the cluster centers are sought, and the algorithm iterates. The algorithm converges quickly for good initial choices of the cluster centers. Self-organizing maps (SOM) are closely related to the K-means procedure. The K clusters resulting from the SOM method correspond to K representative points in a prespecified geometrical configuration, such as a rectangular grid. Data points are mapped onto the grid, and the positions of the representative points are iteratively updated in a manner that eventually places each one at a cluster center. Clusters that are close to each other in the initial arrangement tend to be more similar to each other than those that are further apart.

Because each of the above techniques comes with its own caveats, clustering results vary greatly, even on the same collection. Hierarchical clustering methods share two inherent problems. First, decisions to join two elements are based solely on the distance between those elements, and once elements are joined they cannot be separated. This is a local decision-making scheme which does not consider the data as a whole, and it may lead to mistakes in the overall clustering. In addition, for large data sets, the hierarchical tree is complex, and the choice of location for cutting the tree is unclear.

As for K-means clustering, the main issue is that the number of clusters, K, must be specified prior to performing the algorithm. For the vast majority of document collections, the number of clusters is not known in advance, and the final clustering depends heavily on the choice of K. Furthermore, clusters formed by K-means do not satisfy a quality guarantee. The SOM method likewise assumes that K is specified a priori. In addition, it requires the choice of an underlying geometry. Finally, all of the above techniques typically operate on continuous data. In the case of document clustering, the data is inherently discrete. There has been a lack of efficient ways for clustering documents.

SUMMARY OF THE DESCRIPTION

According to one embodiment, a latent semantic mapping (LSM) space is generated from a collection of a plurality of documents. The LSM space includes a plurality of document vectors, each representing one of the documents in the collection. For each of the document vectors considered as a centroid document vector, a group of document vectors is identified in the LSM space that are within a predetermined hypersphere diameter from the centroid document vector. As a result, multiple groups of document vectors are formed. The predetermined hypersphere diameter represents a predetermined closeness measure among the document vectors in the LSM space. Thereafter, a group from the plurality of groups is designated as a cluster of document vectors, where the designated group contains a maximum number of document vectors among the plurality of groups.

According to another embodiment, in response to a new document to be classified, the new document is mapped into a new document vector in an LSM space. The LSM space includes one or more semantic anchors representing one or more clusters of document vectors. Each of the one or more clusters is generated based on a given collection of document vectors in which a group having a maximum number of document vectors within a predetermined closeness measure in the LSM space is designated as one of the one or more clusters. A closeness distance is then measured between the new document vector and each of the semantic anchors in the LSM space. Thereafter, the new document is classified as a member of one or more of the clusters if the closeness distance between the new document vector and one or more corresponding semantic anchors is within a predetermined threshold.

According to a further embodiment, a hypersphere diameter is selected as a current hypersphere diameter from a range of hypersphere diameters in an LSM space. The LSM space includes document vectors, each representing one of documents of a collection. For each of the document vectors in the LSM space considered as a centroid document vector, iteratively performing the following: 1) identifying a group of document vectors in the LSM space that are within the current hypersphere diameter from the centroid document vector; 2) calculating a ratio between a first number of document vectors of the identified group associated with the current hypersphere diameter and a second number of document vectors of a group associated with a previous hypersphere diameter; 3) adjusting the current hypersphere diameter by a predetermined value; 4) repeating the identifying and calculating operations, forming a plurality of groups of document vectors; and 5) designating a group associated with a maximum ratio among the calculated plurality of ratios as a cluster candidate.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
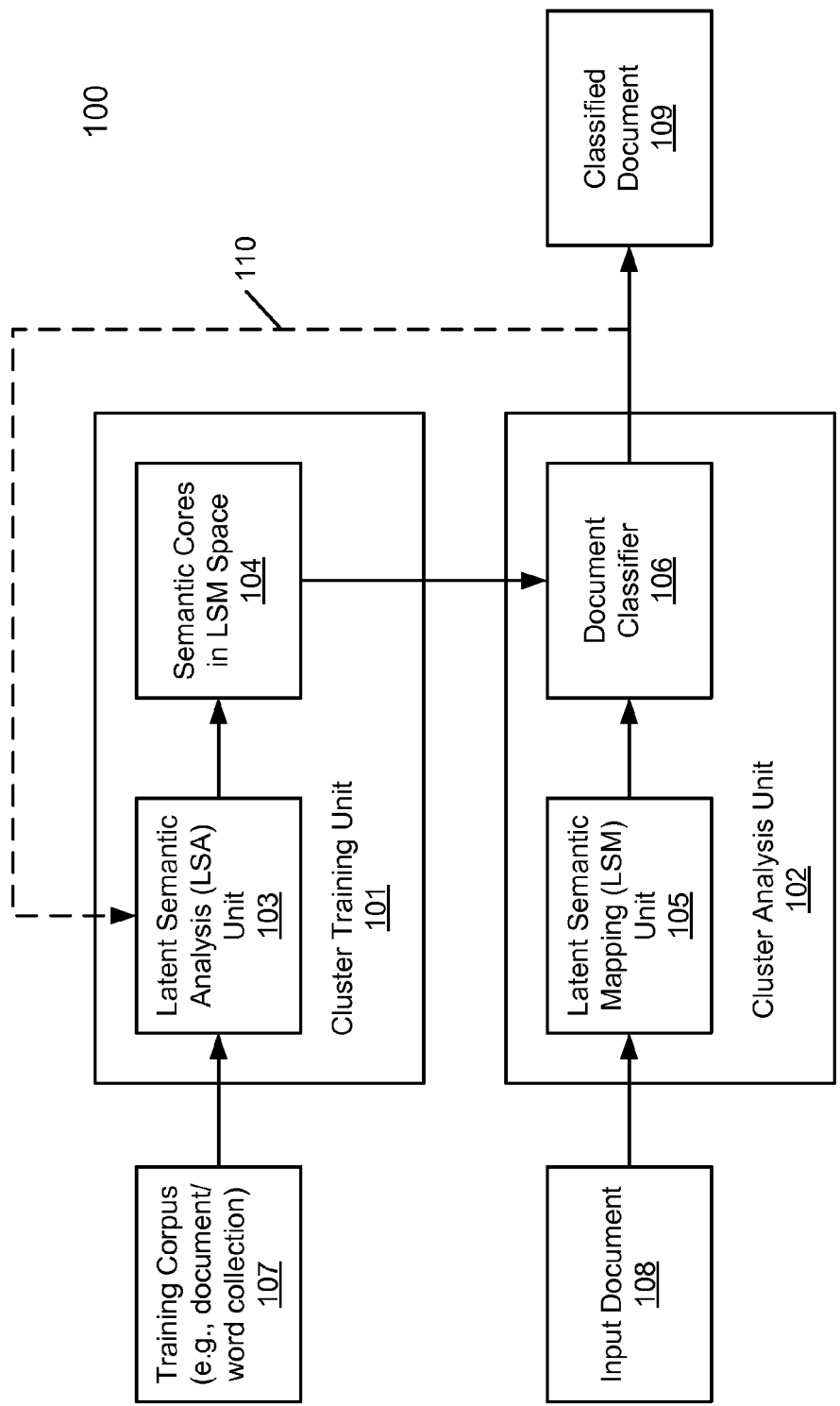
FIG. 1 is a block diagram illustrating a system for clustering documents according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a clustering technique based on a density analysis in an LSM space is utilized in which (i) it is well aligned with a an LSM framework; (ii) it takes into account the entire data; and (iii) it works with any number of underlying clusters. The basic idea is to perform a density analysis in the LSM space to narrow down potential cluster centroids, also referred to as semantic anchors. The total number of clusters is not needed at the start of the algorithm, and all of the clusters achieve a quality guarantee expressed as a relative cluster density.

LSM is a method that automatically uncovers the salient semantic relationships between words and documents in a given corpus. Discrete words are mapped onto a continuous semantic vector space, in which clustering techniques may be applied. Note that throughout this application, for the purpose of illustration, the terms of "document" and "document vector" are interchangeable terms dependent upon the domain in which they are referred. A document in the LSM space is referred to as a document vector. Thus, when a term of "document" is discussed in the LSM space, it refers to a document vector, or vice versa.

According to one embodiment, the first task is to compute, for each observation (e.g., a document selected from the collection used as a centroid) available in the LSM space, its nearest neighbors (L), where L represents a number of document vectors representing a collection of documents within a particular neighborhood in the LSM space. The exact value of L is largely immaterial as long as it is "large enough" for the problem at hand. In fact, it can take L to equal the size of the entire collection (e.g., a collection of document vectors representing the collection of documents), though this may not be optimal from a computational point of view.

According to one embodiment, among these L neighbors, K points or elements (e.g., K document vectors) that lie within a hypersphere of a pre-specified diameter, referred to herein as a hypersphere diameter, are retained or identified. Here, K represents a number of documents that are located within a pre-specified hypersphere diameter from a particular centroid in the LSM space. Note that K typically varies from observation to observation. The first cluster is then centered around the observation (e.g., centroid) with the maximum value of K. The corresponding K points are then removed from consideration (e.g., removed from the collection). Thereafter, the above operations are iteratively performed on the remaining observations in the collection.

This approach has a number of advantages over conventional clustering methods. First, the algorithm is not sensitive to the order in which the similar data appears. Because all observations are available when computing individual neighborhoods, there is no bias associated with forming clusters one at a time. What matters is the density profile of each candidate grouping in the LSM space, leading to the largest clusters that satisfy the quality guarantee (as specified in terms of a hypersphere diameter).

Second, because each observation is considered as a potential cluster center or centroid, local decisions do not have a large impact on the final clustering. Some of the elements that are incorporated into a neighborhood at the beginning of a stage are free to end up in another neighborhood that eventually leads to the selected cluster at that stage. Therefore, the method is less sensitive than the hierarchical methods to small perturbations in the data, including the removal of observations through filtering.

Finally, selecting the hypersphere parameter is somewhat less critical than choosing K in K-means or cutting the tree in hierarchical clustering. Although this value affects both the size and the number of clusters formed, it does not cause a significant impact on the locations of the main cluster centroids. In addition, conventional techniques assign every observation to a cluster. If the prespecified number of clusters is too small, unrelated patterns are clustered together. If it is too large, clusters with similar patterns are broken apart. In the clustering techniques described further below, each cluster at least maintains a quality guarantee, and no unrelated patterns are forced into a large cluster. A multi-resolution version of the algorithm can also be derived to further increase robustness.

FIG. 1 is a block diagram illustrating a system for clustering documents according to one embodiment of the invention. Referring to FIG. 1, system 100 includes cluster training unit 101 and cluster analysis unit 102. Cluster training unit 101 includes a latent semantic analysis (LSA) unit 103 to construct an LSM space by performing an LSA on training corpus 107, which generates a set of semantic cores or schemes 104 in the LSM space, where each of the semantic cores 104 may represent a potential cluster. The centroid of each of semantic cores 104 is referred to as a semantic anchor. Training corpus 107 includes a collection of documents and a collection of words. In one embodiment, LSA unit 103 is configured to construct the LSM space based on the collection of documents and words to generate one or more document vectors, each representing one of the documents in training corpus 107.

Once semantic cores 104 have been generated, they can be used by cluster analysis unit 102 to classify input document 108 to one or more of the clusters represented by semantic cores 104 as classified document 109. In one embodiment, cluster analysis unit 102 includes LSM unit 105 and document classifier 106. LSM unit 105 is configured to map input document 108 into a document vector in the LSM space created by cluster training unit 101. In one embodiment, LSM unit 105 takes document 108, and maps that into an LSM space that describes relationships between documents based on data, such as words and/or other data (e.g., metadata), that correlate with each other in the documents. For example, the topic of a document may be driven by relationships between the data representing the document. Document 108 may be part of a web page, a text document (e.g., speech-to-text document or metadata representing a video clip or other media contents), an email or other messages, etc.

Referring back to FIG. 1, document classifier 106 is configured to classify the document vector representing input document 108 in the LSM space in view of semantic cores 104 to determine which of the semantic cores having the closest distance measure (e.g., shortest closeness measure) with the input document vector. Based on the closeness measure between the input document vector and the semantic anchors of semantic cores 104, input document 108 can be classified as a member of one or more of the clusters represented by one or more of semantic cores 104. Subsequently, input document 108 may also be utilized as part of training corpus 107 for further clustering via path 110, which may yield one or more new clusters or semantic cores or alternatively, merge multiple semantic cores into one. Note that some or all of the components as shown in FIG. 1 may be implemented in software, hardware, or a combination of both.

In one embodiment, an LSM space is constructed based on a collection of document and a collection of words as part of training corpus 107. For example, let T, |T|=N, be a collection of documents, and V, |V|=M, be the associated set of words (possibly augmented with some strategic word pairs, triplets, etc., as appropriate) observed in this collection. Generally, M is on the order of several tens of thousands, while N may be as high as a million. First, a (M×N) matrix W is constructed, whose elements $w_{ij}$ suitably reflect the extent to which each word $w_i \in V$ appeared in each document $t_j \in T$. A reasonable expression for $w_{ij}$ can be represented as:

$$w_{ij} = (1-\varepsilon_i)\frac{c_{ij}}{n_j} \quad (1)$$

where $c_{i,j}$ is the number of times w, occurs in document $t_j$; $n_j$ is the total number of words present in this document; and $\varepsilon_i$ is the normalized entropy of $w_i$ in V. The global weighting implied by $(1-\varepsilon_i)$ reflects the fact that two words appearing with the same count in a particular document do not necessarily convey the same amount of information; this is subordinated to the distribution of words in the entire set V.

A singular value decomposition (SVD) of W can be derived based on the following equation:

$$W = USV^T \quad (2)$$

where U is the (M×R) left singular matrix with row vectors $u_i$ (1≤i≤M); S is the (R×R) diagonal matrix of singular values s1≥s2≥ ... ≥sR>0; V is the (N×R) right singular matrix with row vectors $v_j$ (1≤j≤N), R>>M; N is the order of the decomposition, and $^T$ denotes matrix transposition.

Both left and right singular matrices U and V are column-orthonormal, i.e., $U^T U = V^T V = IR$ (the identity matrix of order R). Thus, the column vectors of U and V each define an orthonormal basis for the space of dimension R spanned by the $u_i$'s and $v_j$'s. This space is referred to as the latent semantic space L. The (rank-R) decomposition encapsulates a mapping between the set of words $w_i$ and documents $t_j$ and (after appropriate scaling by the singular values) the set of R-dimensional vectors $y_i = u_i S$ and $z_j = v_j S$.

The basic idea behind equation (2) is that the rank-R decomposition captures the major structural associations in W and ignores higher order effects. Hence, the relative positions of the documents in the space L reflect a parsimonious encoding of the semantic concepts used in the domain considered. This means that two documents that are "close" (in some suitable metric) in the LSM space can be expected to be related to the same concept. This provides a basis for performing meaningful clustering in this space.

Further detailed information concerning the LSM techniques described above can be found in the article entitled "Latent Semantic Mapping: a Data-Driven Framework for Modeling Global Relationships Implicit in Large Volumes of Data" by Jerome R. Bellegarda, published in the IEEE Signal Processing Magazine, September 2005, which is incorporated by reference herein in its entirety. The latent semantic mapping using the SVD technique has also been described in U.S. Pat. No. 6,374,217; U.S. Pat. No. 7,124,081; U.S. Pat. No. 7,076,527; and U.S. Pat. No. 7,149,695, which are incorporated by reference herein in their entirety.

The LSM techniques described above can be applied to latent semantic density clustering, such as, for example, document density clustering. In order to do so, according to one embodiment, a suitable distance measure is defined to compare two document vectors in the LSM space L. Based on the article incorporated by reference above, a natural closeness metric to consider is the cosine of the angle between them. Among other possibilities, according to one embodiment, the associated distance measure can be defined as follows:

$$D(z_k, z_l) = \cos^{-1}\left(\frac{z_k z_l^T}{\|z_k\| \|z_l\|}\right) \quad (3)$$

for any 1≤k, 1≤N. Using equation (3), it is to compute the L closest neighbors to a given document as a centroid document.

Now assuming that D is a suitable hypersphere diameter, in one embodiment, for each document vector $z_j \in L$, a set or group of document vectors $G_j$ can be defined as:

$$G_j = \{z_k : D(z_j, z_k) \le D\} \quad (4)$$

and denote its cardinality by $|G_j| = K_j < L$. A cluster can then be obtained as:

$$C_1 = G_j : K_j = \max_{1 \le l \le N} K_l \quad (5)$$

That is, for a given or predetermined hypersphere diameter (D), for each of the document vectors in the collection (L), which is considered as a centroid or centroid document vector ($z_j$), a group of document vectors ($G_j$) that are located within the hypersphere diameter (D) is identified based on equation (4), which generates multiple groups of document vectors, each representing a potential cluster or cluster candidate. From the groups of document vectors identified via equation (4), one of the groups having the maximum number of document vectors included therein is designated as a cluster based on equation (5). Such a cluster is also referred to herein as a semantic core and its corresponding centroid is referred to as the semantic anchor of that semantic core, where each semantic core has only one semantic anchor.

The corresponding vectors associated with the designated group of document vectors ($G_j$) are removed from the collection (L). For each document vector remained in the collection under consideration, in one embodiment, the associated $G_j$ is suitably updated to reflect the loss of the vectors set aside in $C_1$, and the above process is iteratively performed on the remaining set in the collection (e.g., L–C1), for example, to identify another potential cluster or semantic core.

That is, after a cluster has been identified, vectors representing the documents within the identified cluster are removed from the collection in the LSM space for further consideration. For the remaining document vectors in the collection, the above process is iteratively performed for all document vectors remained in the collection. Alternatively, the above process is iteratively performed until one or more conditions are satisfied. In one embodiment, a possible termination criterion is to stop when the largest remaining cluster has fewer than a predetermined number of element vectors (e.g., a predetermined number of document vectors).

Figure 2:
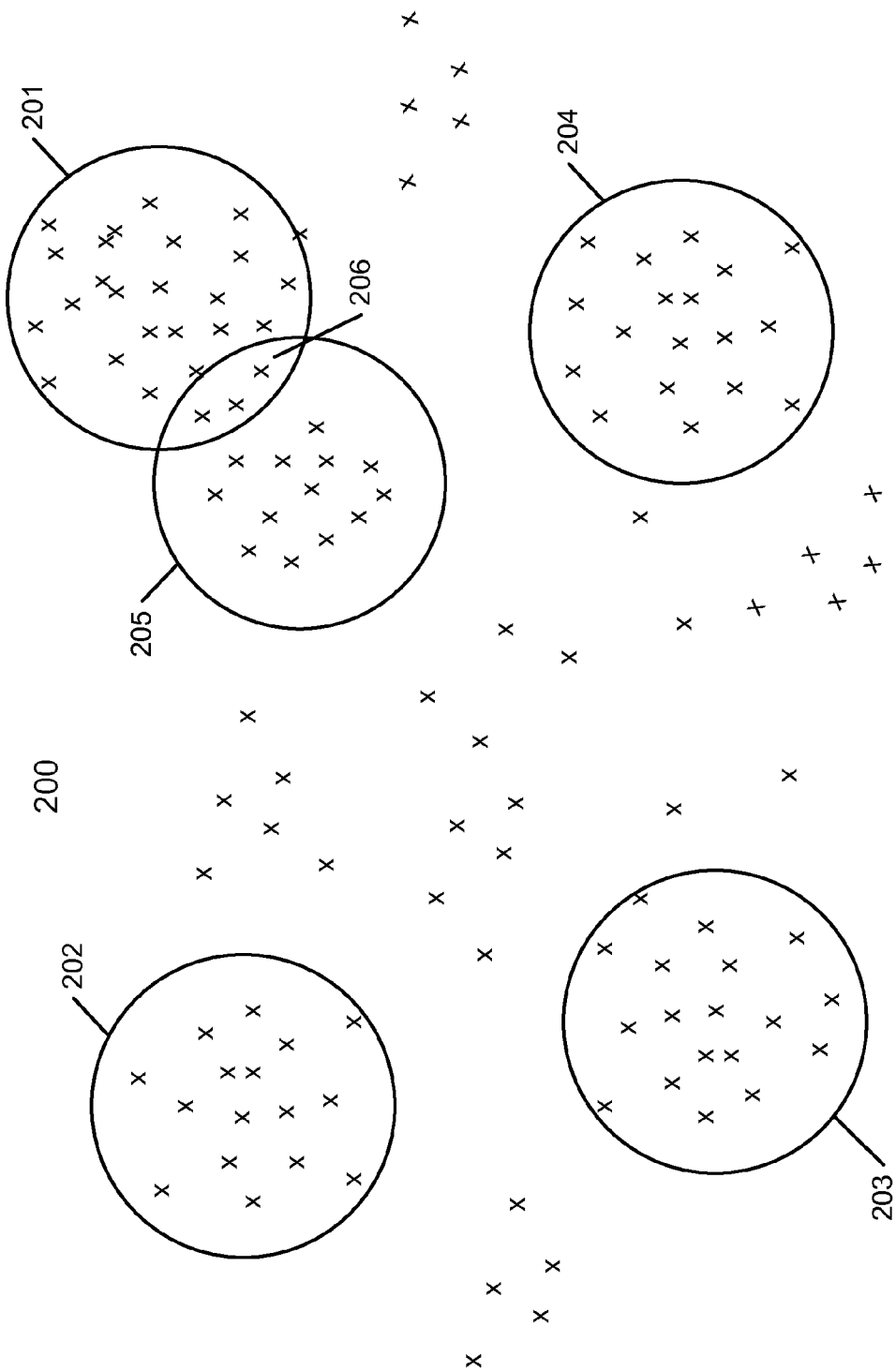
FIG. 2 is a diagram illustrating a process for identifying document clusters in an LSM space according to one embodiment of the invention.

FIG. 2 is a diagram illustrating a process for identifying document clusters in an LSM space according to one embodiment of the invention. Referring to FIG. 2, it is assumed that a set of documents, as a training corpus, have been mapped into the LSM space 200 as a collection of document vectors, each being represented by "x". For each of the document vectors representing a particular document in the LSM space, according to one embodiment, a group of document vectors that are located within a predetermined hypersphere diameter in the LSM space is identified. For the purpose of illustration, it is assumed that groups 201-204 are identified, which have the same hypersphere diameter. Note that initially in the first overall iteration, the number of groups should be the same number of document vectors in the collection, since a group of document vectors is identified for each of the document vectors in the collection.

From groups 201-204, one of the groups that has the maximum number of document vectors included therein is selected and designated as a cluster. In this example, it is assumed that group 201 has the largest number of document vectors included therein compared to groups 202-204. Thus, group 201 is designated as a cluster in this example. Once group 201 has been designated as a cluster, the document vectors within group 201 are removed from the collection in LSM space 200. Thereafter, the above process is iteratively performed to identify other clusters such as groups 202-204. In addition, when the document vectors of a designated group such as group 201 are removed, certain document vectors that are part of the designated group and part of another group such as group 205 (e.g., document vectors in overlapped area 206 in this example) may stay to compensate group 205 for further consideration. The above process may be iteratively performed for all of the remaining document vectors in the collection. Alternatively, the above process may be iteratively performed until a certain condition or conditions are met. For example, the above process may be iteratively performed until a designated group in the latest iteration has fewer than a predetermined document vectors included therein.

Figure 3:
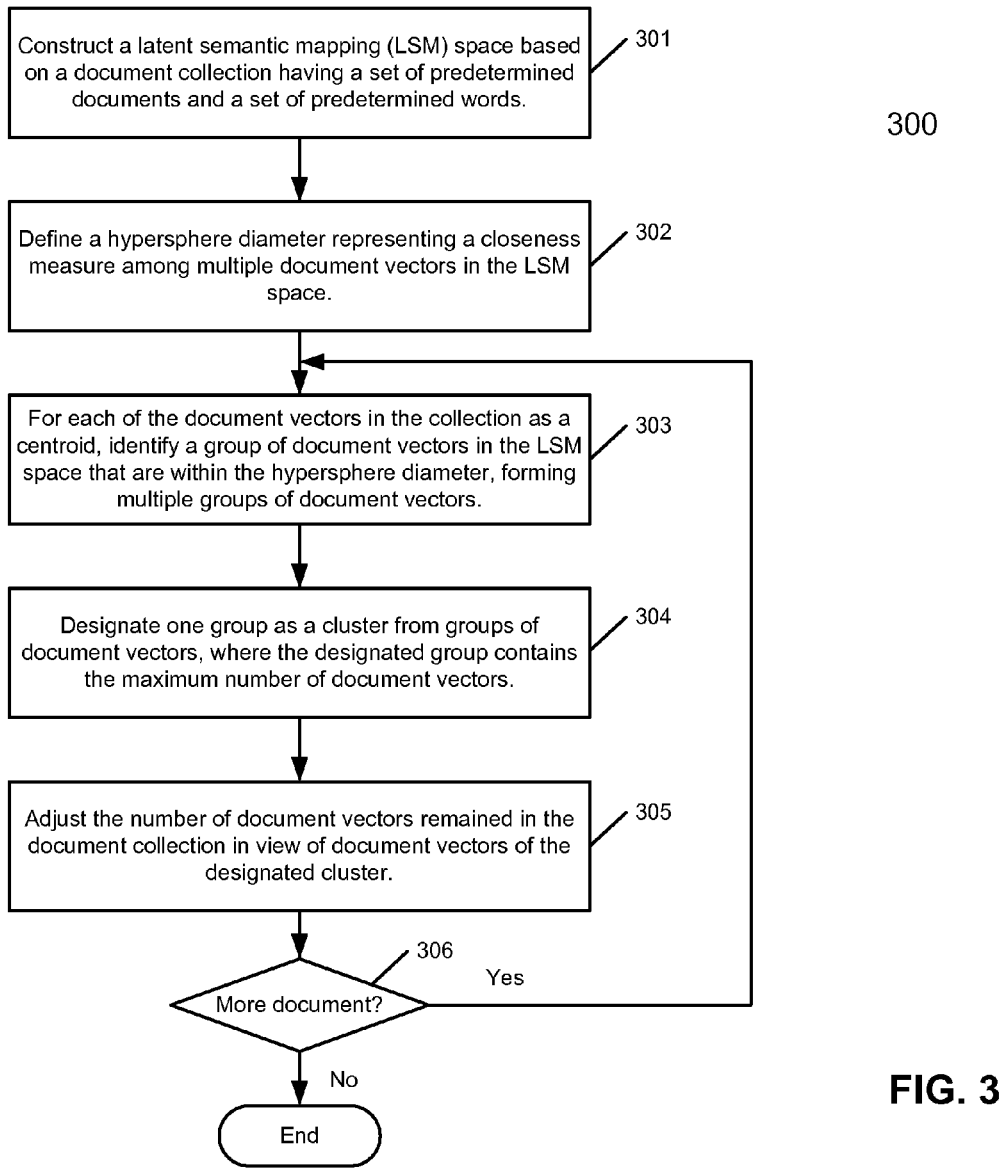
FIG. 3 is a flow diagram illustrating a method for identifying document clusters in an LSM space according to one embodiment of the invention.

FIG. 3 is a flow diagram illustrating a method for identifying document clusters in an LSM space according to one embodiment of the invention. For example, method 300 may be performed by cluster training unit 101 of FIG. 1. Referring to FIG. 3, at block 301, an LSM space is constructed based on a collection (e.g., training corpus) having a set of predetermined documents and words. At block 302, a hypersphere diameter is defined to represent a closeness measure among multiple document vectors each representing a document in the LSM space. At block 303, for each of the document vectors in the collection as a centroid document vector, a group of document vectors are identified in the LSM space that are located within the predetermined hypersphere diameter, which generates multiple groups of document vectors (e.g., cluster candidates). At block 304, one of the groups having the maximum number of document vectors included therein is selected and identified as a cluster. At block 305, the document vectors within the designated group are removed from the collection. Optionally, certain document vectors that associated with a group that is overlapped with the designated group may be compensated for the remaining groups in the collection. If it is determined at lock 306 that there are more document vectors in the LSM space, the above process is iteratively performed for all of the remaining document vectors in the collection. Alternatively, the above process may be iteratively performed until a certain condition or conditions are met as described above.

Although perhaps less critically so than with other clustering techniques, the outcome of the above procedure may be influenced by the choice of the hypersphere diameter D. There may be some interplay between the underlying distribution of natural clusters and the size of this parameter. When D is chosen small enough that many clusters are generated, the smallest clusters thus obtained are typically located at the periphery of legitimate, larger clusters, and can easily be folded into the larger clusters or ignored without prejudice. When the parameter D is chosen too large relative to the size of the natural clusters, however, there is a danger of coming up with large clusters at inappropriate locations in the latent semantic space, such as straddling the boundary between two natural clusters.

To remedy this situation, the notion of multi-resolution density clustering is introduced. The idea is to avoid centering a cluster on an observation which falls within a relatively less dense region of the space, as is typically the case away from natural cluster centers. According to one embodiment, this requires considering a range of hypersphere diameters $D_p$ with $D_1 \leq D_p \leq D_P$, where $1 \leq p \leq P$. In this case, for each document vector $z_i$, L, according to one embodiment, a set of document vectors $G_j^p$ is defined as:

$$G_j^p = \{z_k : D(z_j, z_k) \leq D_p\} \qquad (6)$$

and denote its cardinality by $|G_j^p| = K_j^p$. Note that, by construction, $K_j^1 \leq K_j^p \leq K_j^P$, according to one embodiment, a cluster can be obtained as:

$$C_1 = G_j^p : K_j^p = \max_{1 \leq l \leq N1} \max_{\leq q \leq P} f\left(\{\{K_l^q\}_{q=1}^P\}_{l=1}^N\right) \qquad (7)$$

where f(•) is an appropriate or predefined function of the cardinalities observed at different resolutions (e.g., different hypersphere diameters). Typically, this function is defined so that the cluster candidate with maximum cardinality (e.g., a number of document vectors) at increasing resolutions wins.

In one embodiment, function f(•) is defined as follows:

$$f\left(\{\{K_l^q\}_{q=1}^P\}_{l=1}^N\right) = \frac{K_l^q}{K_l^{q+1}} \quad (8)$$

$K_l^q$ is referred to as a number of document vectors within a hypersphere diameter identified by index of q (e.g., $D_q$) for a given document vector of l as a centroid. $K_l^p$ is referred to as a number of document vectors within a hypersphere diameter identified by index of (q+1) (e.,g., $D_{q+1}$) for a given document vector of l as a centroid, where 1<=p<=P and 1<=q<=P. For example, the range of hypersphere diameters could be implemented as an array of hypersphere diameters D[predetermined number of entries], each being accessible based on a corresponding index. In this example, processing logic may "walk" through the range of hypersphere diameters in the array by decrementing or incrementing the index to determine the most appropriate hypersphere diameter (by determining the largest difference in terms of number of document vectors included therein between two adjacent indexes) in order to define the most accurate boundary for a cluster.

In another embodiment, function f(•) is defined as follows:

$$f\left(\{\{K_l^q\}_{q=1}^P\}_{l=1}^N\right) = \frac{K_l^q}{\max\limits_{1 \le k \le N} K_k^q} \bigg/ \left(\frac{1}{P}\sum_{p=1}^P \frac{K_l^p}{\max\limits_{1 \le k \le N} K_k^p}\right)$$

According to one embodiment, for each document vector in the LSM space, which is taken as a centroid, a number of document vectors are recorded for a range of hypersphere diameters, for example, starting from a larger one to a smaller one in a descending order (representing the increasing resolutions). For every two adjacent hypersphere diameters selected from the range, a ratio between the numbers of document vectors in the adjacent hypersphere diameters is calculated. A group associated with the maximum ratio is designated as a cluster candidate for that particular centroid. That is, one cluster candidate is generated for each of the document vectors currently located in the LSM space. From all of the cluster candidates, one cluster candidate having the maximum number of document vectors included therein is selected as a final cluster candidate to be designated as a cluster. The document vectors of the final cluster candidate are then removed from the collection with optional compensation with overlapped cluster candidates. Thereafter, the above process is iteratively performed to identify other clusters as described above. This multi-resolution clustering process can be used to weed out candidates that may look promising for high values of D but are suboptimal for lower values of D.

Figure 4:
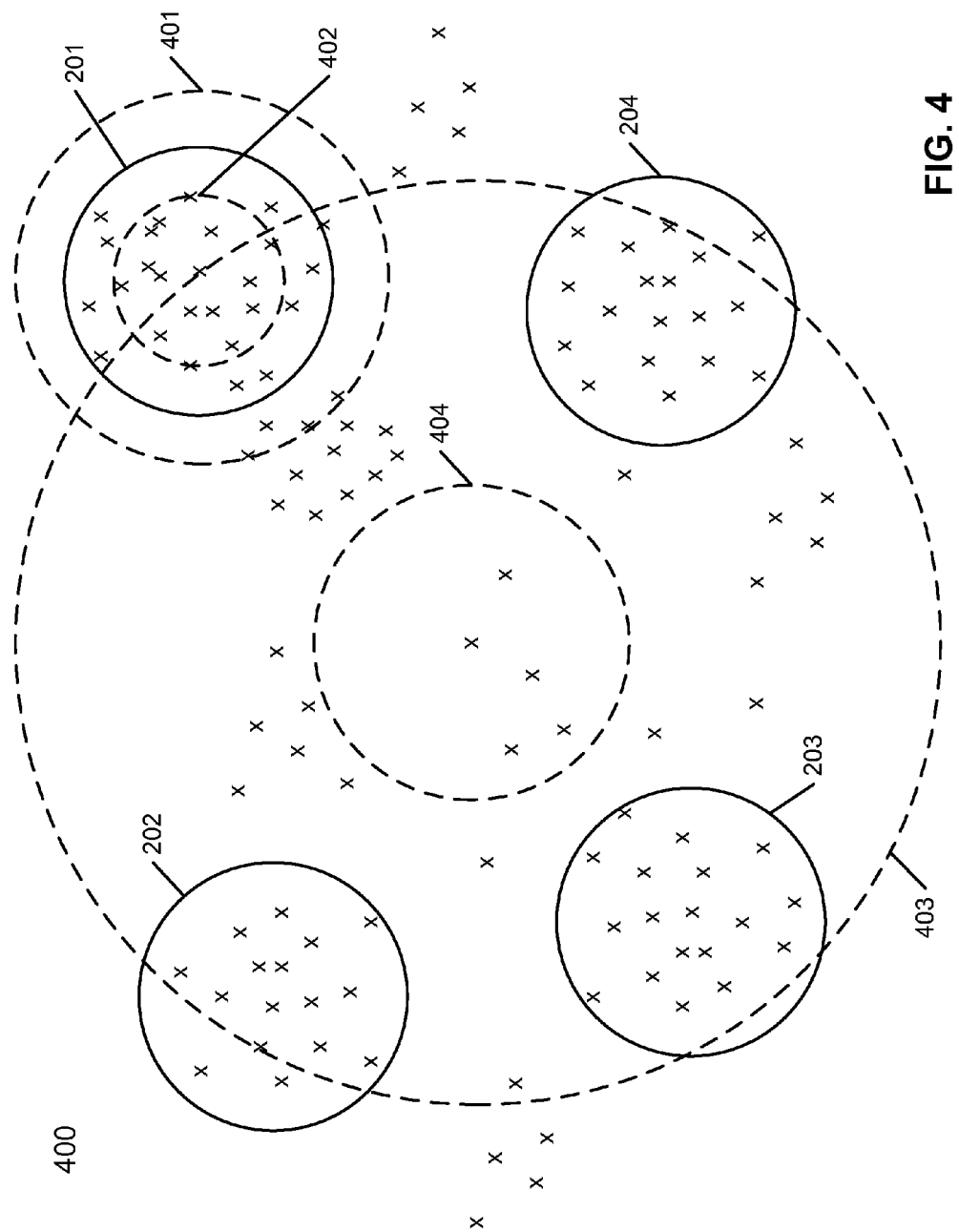
FIG. 4 is a diagram illustrating a method for multi-resolution document clustering according to one embodiment of the invention.

FIG. 4 is a diagram illustrating a method for multi-resolution document clustering according to one embodiment of the invention. Referring to FIG. 4, for the purpose of illustration, for a document vector selected as a centroid for group 201, a predetermined range of hypersphere diameters from 401 to 402 are defined. For each of the hypersphere diameter selected as a current hypersphere diameter from the range, for example, starting from a larger hypersphere diameter 401 to a smaller hypersphere diameter 402, a number of document vectors within the current hypersphere diameter are recorded. A ratio between a number of document vectors within the current document vector and a number of document vectors of a previous hypersphere diameter of a previous iteration is calculated. This process is repeated for all of the hypersphere diameters in the range. Alternatively, ratios between two adjacent selected hypersphere diameters are calculated altogether after the iteration process has been completed.

From all of the ratios calculated, a group of document vectors associated with the maximum ratio is selected as a cluster candidate, in this example, group 201. The above process is then repeated for each of the remaining document vectors as a centroid document vector, which generates multiple cluster candidates. Among all of the cluster candidates, a cluster candidate having the maximum number of document vectors included therein is selected as a final cluster candidate to be designated as a cluster, in this example, group 201. Thereafter, the document vectors associated with group 201 are removed from LSM space 400 and the above processes are iteratively performed to identify other potential clusters, such as clusters 202-204. In addition, according to one embodiment, it is possible to further mitigate the influence of each cluster on subsequent clusters by removing its elements from consideration for future potential cluster centers, but not removing them from the latent space altogether. This way they can still contribute to the ranking and positions of remaining observations.

As a result, this multi-resolution clustering process may weed out candidates that may look promising for high values of D but are suboptimal for lower values of D. For example, referring back to FIG. 4, if hypersphere diameter 403 is selected, it certainly contains a large amount of document vectors. However, for the same centroid, as the hypersphere diameter becomes smaller (e.g., increased resolution), for example, reduced to hypersphere diameter 404, the number of document vectors included therein becomes much smaller. Thus, in this example, hypersphere diameter 403 should not be used to define a cluster candidate.

Figure 5:
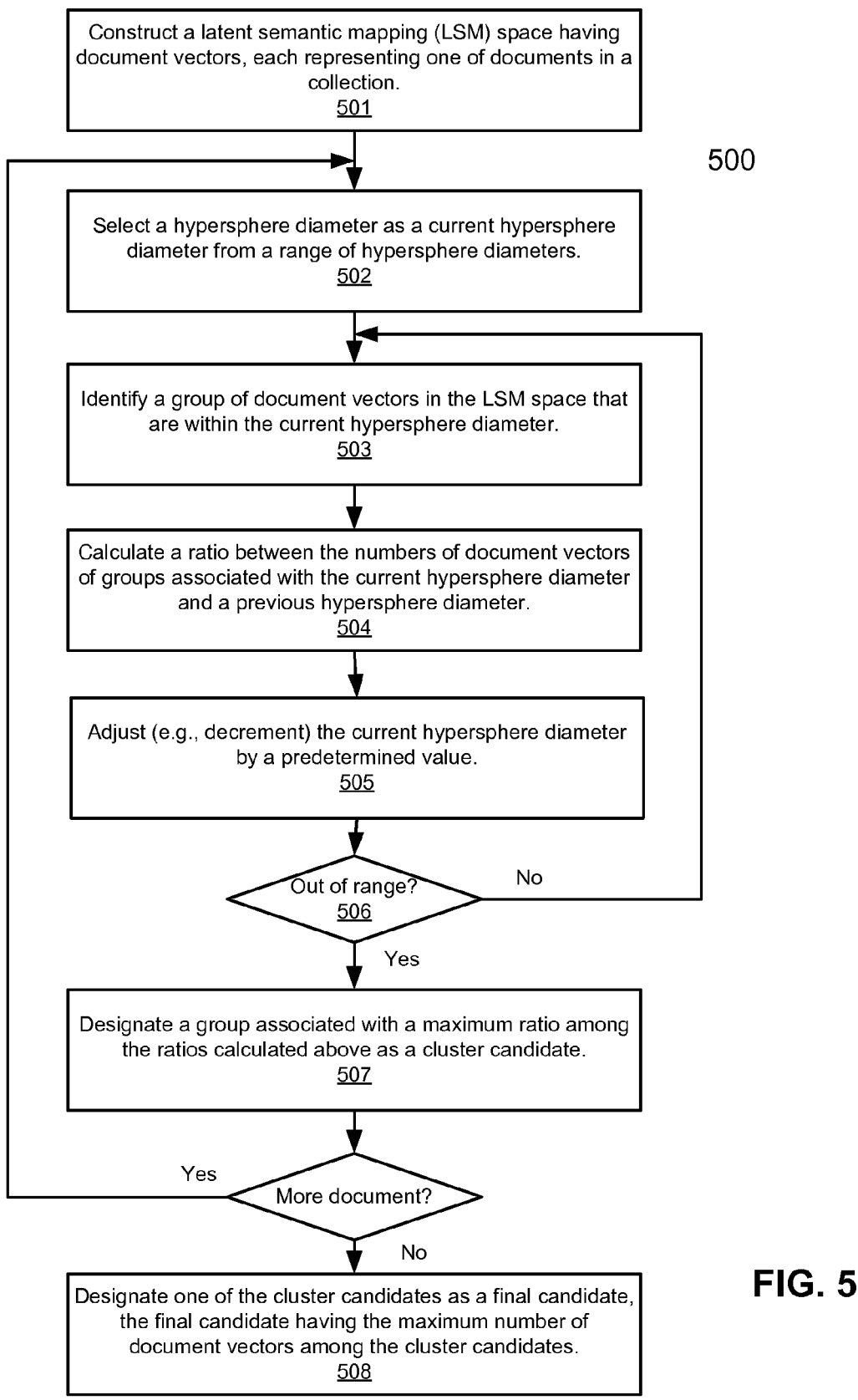
FIG. 5 is a flow diagram illustrating a method for clustering documents according to another embodiment of the invention.

FIG. 5 is a flow diagram illustrating a method for clustering documents according to another embodiment of the invention. For example, method 500 may be performed by cluster training unit 101 of FIG. 1. Referring to FIG. 5, at block 501, an LSM space is constructed based on a collection of documents. The LSM space includes documents vectors, each representing one of the documents in the collection. At block 502, a hypersphere diameter is selected as a current hypersphere diameter from a range of predetermined hypersphere diameters. For each of the document vectors in the LSM space, which is used as a centroid document vector, at block 503, a group of document vectors is identified in the LSM space, where the document vectors of the identified group are located within the current hypersphere diameter in view of the corresponding centroid document vector. At block 504, a ratio between numbers of document vectors of groups associated with the current hypersphere diameter and a previous hypersphere diameter (e.g., a hypersphere diameter selected for a previous iteration) is calculated.

At block 505, the current hypersphere diameter is adjusted (e.g., decremented), for example, by a predetermined value. The operations involved at blocks 502-505 are iteratively performed, until the current hypersphere diameter is out of the range of hypersphere diameters at block 506, which generate a set of ratios, one for each selected hypersphere diameter. At block 507, a group of document vectors associated with a maximum ratio among all the ratios calculated above is designated as a cluster candidate. The above operations (e.g., blocks 502-507) are iteratively performed for each of the document vectors in the LSM space, which generate a set of cluster candidates, each corresponding to one of the document vectors (as a centroid) in the LSM space. At block 508, a final cluster candidate having the maximum number of document vectors included therein is selected from the set of cluster candidates and designated as a cluster. Thereafter, as described above, the document vectors of the final cluster candidate are removed from the LSM space, and the above process is iteratively performed to identify other possible clusters.

Figure 6:
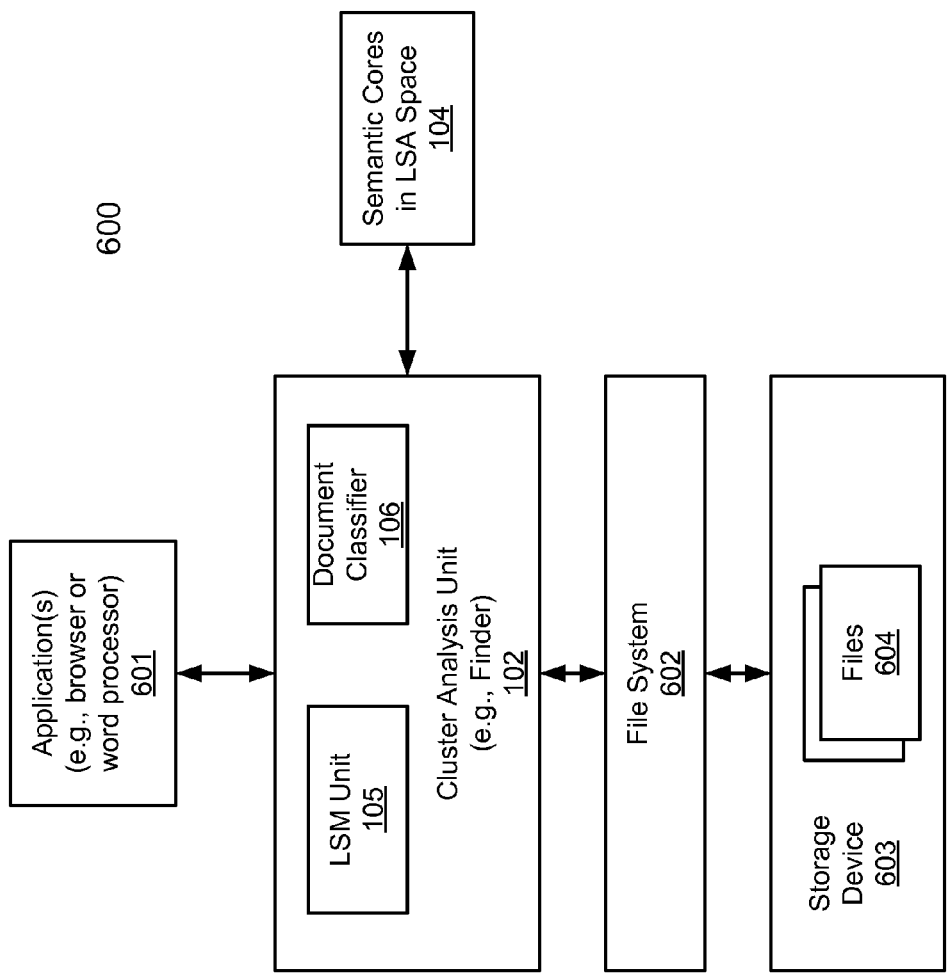
FIG. 6 is a block diagram illustrating a system for classifying a document according to one embodiment of the invention.

According to some embodiments, the techniques described above can be used in a data processing system for clustering documents stored in a storage device. FIG. 6 is a block diagram illustrating a system for classifying a document according to one embodiment of the invention. Referring to FIG. 6, system 600 includes, but not limited to, one or more applications 601 communicatively coupled to a cluster analysis unit 102 and file system 602 for accessing documents or files 604 stored in storage device 603. Cluster analysis unit 102 includes an LSM unit 1056 and document classifier 106 that may utilize semantic cores 104 to classify any document accessed by application 601, where semantic cores 104 may be generated using at least some of the latent semantic clustering techniques described above. Cluster analysis unit 102 may be implemented as part of an operating system, such as a desktop finder utility (e.g., the Finder™ utility available from Apple Inc.)

According to one embodiment, when application 601 accesses a particular document stored in storage device 603, the document can be classified based on semantic cores 104 and the classification information (e.g., metadata representing the cluster associated with the document) is presented to application 601. In one embodiment, the document is mapped by LSM unit 105 into a document vector in an LSM space. A closeness distance with respect to each of semantic cores 104 is measured in the LSM space. For example, the closeness distance is determined by measuring the distance in the LSM space between the document vector and a centroid of each semantic core. If the closeness distance between the document vector and a particular semantic core is within a predetermined threshold, the document may be classified as a member of that particular semantic core (e.g., cluster) by document classifier 106. Note that dependent upon the predetermined threshold, a document can be classified as a member of multiple clusters.

Similarly, when application 601 saves a new file to storage device 603, the new file may also be mapped to the LSM space by LSM unit 105 and classified by document classifier 106 as described above. In addition, according to one embodiment, when the new file is stored in the storage device 603, the new file may be considered as part of a training corpus, i.e., the collection of documents used to generate semantic cores 104, for example, by cluster training unit 101 of FIG. 1. The new file may have an impact on the existing semantic cores dependent upon the content of the new file. Based on the new file to be included into the training set, an existing semantic core may be split into multiple ones or alternatively, multiple existing semantic cores may be merged into one, etc.

Figure 7:
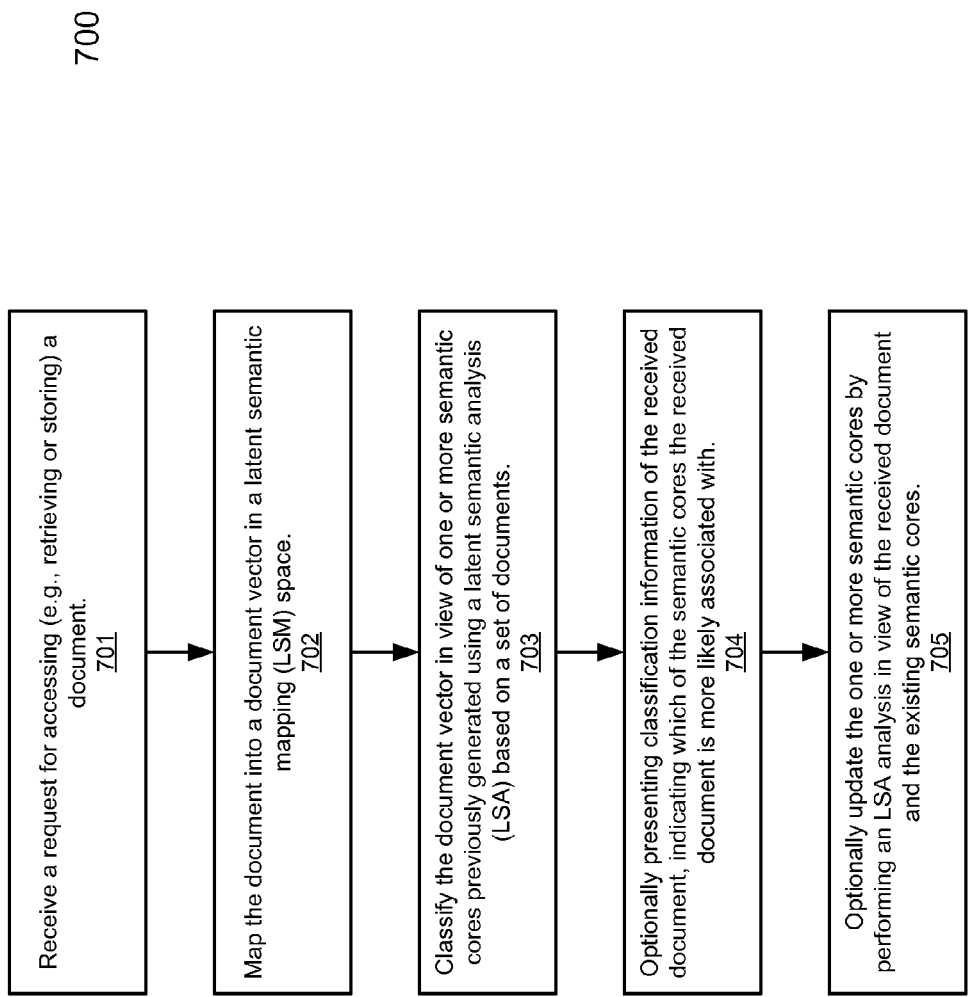
FIG. 7 is a flow diagram illustrating a method for classifying a document according to one embodiment of the invention.

FIG. 7 is a flow diagram illustrating a method for classifying a document according to one embodiment of the invention. For example, method 700 may be performed by system 600 of FIG. 6. Referring to FIG. 7, at block 701, a request for accessing (e.g., retrieving or storing) a document is received. In response to the request, at block 702, the document is mapped into a document vector in an LSM space, where the LSM space includes one or more document vectors (e.g., semantic anchors) representing one or more semantic cores. At block 703, the document vector is classified in view of the one or more semantic cores in the LSM space that are generated based on a set of documents (e.g., training set of documents). At block 704, the classification information is presented, indicating which of the semantic cores the received document is more likely associated with. At block 705, the one or more semantic cores may be updated by performing a new LSA analysis in view of the received document and the existing documents.

Figure 8:
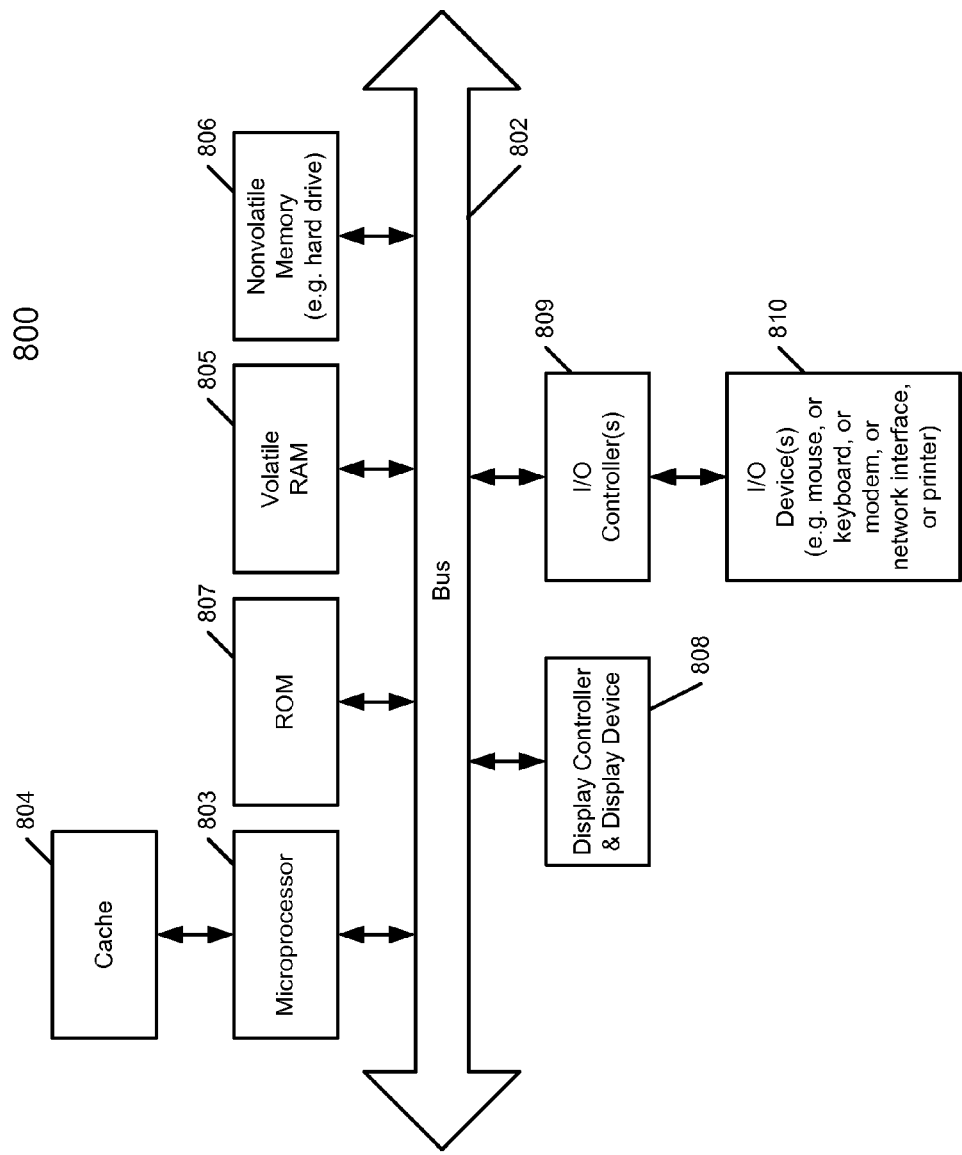
FIG. 8 is a block diagram of a data processing system, which may be used with one embodiment of the invention.

FIG. 8 is a block diagram of a data processing system, which may be used with one embodiment of the invention. For example, the system 800 shown in FIG. 8 may be used as system 100 of FIG. 1 or system 600 of FIG. 6. Note that while FIG. 8 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 8 may, for example, be an Apple Macintosh computer or MacBook, or an IBM compatible PC.

As shown in FIG. 8, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for clustering documents, comprising:
at a device comprising one or more processors and memory:
generating a latent semantic mapping (LSM) space from a collection of a plurality of documents, the LSM space includes a plurality of document vectors, each representing one of the documents in the collection;
identifying a plurality of centroid document vectors from the plurality of document vectors;
forming a plurality of document groups each including a respective group of document vectors in the LSM space that are within a predetermined hypersphere diameter from a respective one of the plurality of centroid document vectors, wherein the predetermined hypersphere diameter represents a predetermined closeness measure among the document vectors in the LSM space; and
selectively designating a particular document group from the plurality of document groups as a document cluster based on the particular document group containing a maximum number of document vectors among the plurality of document groups.

2. The method of claim 1, further comprising:
removing one or more document vectors in the designated document group from the plurality of document vectors in the LSM space; and
repeating the forming and the selectively designating using document vectors still remaining in the LSM space.

3. The method of claim 2, wherein removing and repeating are iteratively performed until the designated document group in the latest iteration contains a number of document vectors that are fewer than a predetermined number of document vectors.

4. The method of claim 2, further comprising compensating one or more groups of document vectors that are overlapped with the designated document group in view of the removed one or more document vectors during the repeating.

5. The method of claim 2, wherein the predetermined hypersphere diameter is selected from a range of hypersphere diameters having incremental size in sequence, and wherein the predetermined hypersphere diameter is identified when a difference in numbers of document vectors in two adjacent hypersphere diameters in the range reaches the maximum.

6. The method of claim 2, further comprising:
in response to a new document, mapping the new document into a new document vector in the LSM space;
determining a closeness measure between the new document vector and each of the document clusters that have been designated in the LSM space; and
classifying the new document as a member of one or more of the document clusters based on the determined closeness measure.

7. The method of claim 6, wherein the closeness measure is determined by measuring a distance between the new document vector and a respective centroid document vector of each document cluster that has been designated in the LSM space.

8. The method of claim 6, further comprising reevaluating the one or more document clusters in view of the new document as a part of the collection of the plurality of documents.

9. A non-transitory machine-readable storage medium having instructions stored thereon, which when executed by a machine, cause the machine to perform a method for clustering documents, the method comprising:
generating a latent semantic mapping (LSM) space from a collection of a plurality of documents, the LSM space includes a plurality of document vectors, each representing one of the documents in the collection;
identifying a plurality of centroid document vectors from the plurality of document vectors;
forming a plurality of document groups each including a respective group of document vectors in the LSM space that are within a predetermined hypersphere diameter from a respective one of the plurality of centroid document vectors, wherein the predetermined hypersphere diameter represents a predetermined closeness measure among the document vectors in the LSM space; and
selectively designating a particular document group from the plurality of groups as a document cluster-based on the particular document group containing a maximum number of document vectors among the plurality of document groups.

10. The machine-readable storage medium of claim 9, wherein the method further comprises:
removing one or more document vectors in the designated document group from the plurality of document vectors in the LSM space; and repeating the forming and the selectively designating using document vectors still remaining in the LSM space.

11. The machine-readable storage medium of claim 10, wherein removing and repeating are iteratively performed until the designated document group in the latest iteration contains a number of document vectors that are fewer than a predetermined number of document vectors.

12. The machine-readable storage medium of claim 10, wherein the method further comprises compensating one or more groups of document vectors that are overlapped with the designated document group in view of the removed one or more document vectors during the repeating.

13. The machine-readable storage medium, wherein the predetermined hypersphere diameter is selected from a range of hypersphere diameters having incremental size in sequence, and wherein the predetermined hypersphere diameter is identified when a difference in numbers of document vectors in two adjacent hypersphere diameters in the range reaches the maximum.

14. The machine-readable storage medium of claim 10, wherein the method further comprises:
in response to a new document, mapping the new document into a new document vector in the LSM space;
determining a closeness measure between the new document vector and each of the document clusters that have been designated in the LSM space; and
classifying the new document as a member of one or more of the document clusters based on the determined closeness measure.

15. The machine-readable storage medium of claim 14, wherein the closeness measure is determined by measuring a distance between the new document vector and a respective centroid document vector of each document cluster that has been designated in the LSM space.

16. The machine-readable storage medium of claim 14, wherein the method further comprises reevaluating the one or more document clusters in view of the new document as a part of the collection of the plurality of documents.

17. A data processing system, comprising:
one or more processors; and
a memory coupled to the one or more processors and storing instructions, which when executed by the one or more processors, cause the processors to:
generate a latent semantic mapping (LSM) space from a collection of a plurality of documents, the LSM space includes a plurality of document vectors, each representing one of the documents in the collection,
identify a plurality of centroid document vectors from the plurality of document vectors;
form a plurality of document clusters each including a respective group of document vectors in the LSM space that are within a predetermined hypersphere diameter from the centroid document vector, wherein the predetermined hypersphere diameter represents a predetermined closeness measure among the document vectors in the LSM space, and
selectively designate a particular document group from the plurality of document groups as a document cluster based on the particular document group containing a maximum number of document vectors among the plurality of document groups.

18. A computer-implemented method for classifying a document, comprising:
at a device comprising one or more processors and memory:
in response to receiving a new document to be classified, mapping the new document into a new document vector in a latent semantic mapping (LSM) space, the LSM space having one or more semantic anchors representing one or more document clusters, wherein each of the one or more document clusters is generated based on a respective iteration of an iterative process performed on a given collection of document vectors, wherein, during the respective iteration, a particular document group from a plurality of document groups is selectively designated as the document cluster based on the particular document group containing a maximum number of document vectors among the plurality of document groups, and wherein each of the plurality of document groups includes a respective group of document vectors within a predetermined closeness measure of a respective one of a plurality of centroid document vectors in the LSM space;
determining a closeness distance between the new document vector and each of the semantic anchors in the LSM space; and
classifying the new document as a member of one or more of the document clusters if the closeness distance between the new document vector and one or more corresponding semantic anchors is within a predetermined threshold.

19. The method of claim 18, wherein the one or more document clusters-are reevaluated in view of the new document which is considered as a part of the given collection of documents.

20. A computer-implemented method for clustering documents, comprising:
at a device comprising one or more processors and memory:
selecting a hypersphere diameter as a current hypersphere diameter from a range of a plurality of hypersphere diameters in a latent semantic mapping (LSM) space, the LSM space having a plurality of document vectors, each representing one of a plurality of documents of a collection; and
for each of the document vectors in the LSM space considered as a centroid document vector, iteratively performing the following:
identifying a document group in the LSM space, the document group including a respective group of document vectors that are within the current hypersphere diameter from the centroid document vector,
calculating a ratio between a first number of document vectors of the identified document group associated with the current hypersphere diameter and a second number of document vectors of a document group associated with a previous hypersphere diameter,
adjusting the current hypersphere diameter by a predetermined value,
repeating the identifying and calculating operations one or more times to form a plurality of document groups, and
selectively designating a particular document group associated with a maximum ratio among the calculated plurality of ratios as an initial cluster candidate.

21. The method of claim 20, further comprising:
selectively designating a particular initial cluster candidate of a plurality of initial cluster candidates as a final cluster candidate based on the final cluster candidate having the maximum number of document vectors among the plurality of initial cluster candidates;

removing one or more document vectors of the final cluster candidate from the plurality of document vectors in the LSM space; and repeating operations of the selecting a hypersphere diameter, the identifying a document group, the calculating a ratio, the adjusting the current hypersphere diameter, the selectively designating a particular document group as an initial cluster candidate, and the selectively designating a particular initial cluster candidate as a final cluster candidate, to form one or more document clusters.

22. The method of claim 21, wherein removing one or more document vectors and repeating the operations are iteratively performed until the final cluster candidate in the latest iteration contains a number of document vectors that are fewer than a predetermined number of document vectors.

23. The method of claim 21, further comprising:

in response to a new document, mapping the new document into a new document vector in the LSM space;

determining a closeness measure between the new document vector and each of the document clusters in the LSM space; and classifying the new document as a member of one or more of the document_clusters based on the determined closeness measure.

24. The method of claim 23, further comprising reevaluating the one or more document clusters in view of the new document as a part of the collection of the plurality of documents.

* * * * *